(12) United States Patent
Zhong et al.

(10) Patent No.: US 10,379,672 B2
(45) Date of Patent: Aug. 13, 2019

(54) DYNAMIC PROXIMITY OBJECT DETECTION

(71) Applicant: Synaptics Incorporated, San Jose, CA (US)

(72) Inventors: Yuan Zhong, San Jose, CA (US); Umha Mahesh Srinivasan, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/649,535

(22) Filed: Jul. 13, 2017

(65) Prior Publication Data

US 2019/0018539 A1    Jan. 17, 2019

(51) Int. Cl.
*G06F 3/041*    (2006.01)
*G06F 3/044*    (2006.01)

(52) U.S. Cl.
CPC ............ *G06F 3/0418* (2013.01); *G06F 3/044* (2013.01); *G06F 3/0416* (2013.01); *G06F 2203/04105* (2013.01); *G06F 2203/04108* (2013.01)

(58) Field of Classification Search
CPC .................. G06F 3/0418; G06F 3/044; G06F 2203/04108; G06F 2203/04105
See application file for complete search history.

(56) References Cited

U.S. PATENT DOCUMENTS

| | | | |
|---|---|---|---|
| 2010/0253645 A1 | 10/2010 | Bolender | |
| 2011/0278078 A1 | 11/2011 | Schediwy et al. | |
| 2014/0002114 A1 | 1/2014 | Schwartz et al. | |
| 2014/0238152 A1 | 8/2014 | Kallassi et al. | |
| 2015/0049064 A1* | 2/2015 | Shin ...................... | G06F 3/0418 345/178 |
| 2016/0026332 A1* | 1/2016 | Xu ......................... | G06F 1/3262 345/173 |
| 2016/0124576 A1* | 5/2016 | Besshi .................. | G06F 3/0416 345/174 |

* cited by examiner

*Primary Examiner* — Aneeta Yodichkas
(74) *Attorney, Agent, or Firm* — Paradice and Li LLP

(57) ABSTRACT

A method of dynamically adjusting a sensitivity of sensor electrodes configured for capacitive sensing in a sensing region of an input device. The input device detects a first input in the sensing region, and acquires force information about the first input via one or more force sensors coupled to the sensing region. The input device dynamically adjusts a sensitivity of the sensor electrodes based at least in part on an amplitude and duration of the force. In some aspects, the input device may increase the sensitivity of the sensor electrodes when a force of the first input exceeds a force threshold for at least a first threshold duration. In some other aspects, the input device may restore the sensitivity of the sensor electrodes to a prior configuration when no input is detected in the sensing region for at least a second threshold duration.

18 Claims, 8 Drawing Sheets

DYNAMIC PROXIMITY OBJECT DETECTION

TECHNICAL FIELD

The present embodiments relate generally to capacitive sensing, and specifically to dynamically adjusting a sensitivity of capacitive sensors to adapt to detected inputs.

BACKGROUND OF RELATED ART

Input devices including proximity sensor devices (also commonly referred to as touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Proximity sensors may operate by detecting changes in an electric field and/or capacitance in the sensing region. In order to detect such changes, the proximity sensors may first determine a "baseline" (e.g., indicating a state of the electric field when no input object is expected to be present) for one or more portions of the sensing region. Input objects (such as a user's finger) in contact with the sensing region may substantially alter the state of the electric field, beyond the baseline, to be detected by the proximity sensors. However, certain objects (such as a gloved finger) may be more difficult to detect based on their capacitive properties. For example, the thickness and/or dielectric properties of a user's glove may affect the accuracy with which the proximity sensors are able to detect the user's finger. Thus, it is desirable to dynamically adjust a sensitivity of the proximity sensors to adapt to different input objects.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for dynamically adjusting a sensitivity of sensor electrodes, configured for capacitive sensing in a sensing region of an input device, is disclosed. The input device detects a first input in the sensing region, and acquires force information about the first input via one or more force sensors coupled to the sensing region. The input device may dynamically adjust a sensitivity of the plurality of sensor electrodes based at least in part on an amplitude and duration of the force.

The input device may detect that a trigger condition is satisfied, at least in part, when the amplitude of the force exceeds a force threshold for at least a first threshold duration. In some aspects, the input device may increase the sensitivity of the plurality of sensor electrodes when the trigger condition is satisfied. In some other aspects, the input device may restore the sensitivity of the plurality of sensor electrodes to a prior configuration when no input is detected in the sensing region for at least a second threshold.

The input device may further acquire capacitive sensing information about the first input via the plurality of sensor electrodes. The input device may then determine, based on the capacitive sensing information, that a capacitive property of the first input is below a capacitive threshold. For example, the capacitive threshold may be associated with a capacitive property of a gloved finger. In some aspects, the trigger condition is satisfied only when the amplitude of the force exceeds the force threshold for at least the first threshold duration and the capacitive property of the first input is below the capacitive threshold. In some other aspects, the input device may determine a capacitive sensing baseline for one or more of the sensor electrodes, when the trigger condition is satisfied, based at least in part on the capacitive sensing information about the first input.

The input device may also request a second input from a user of the input device when the trigger condition is satisfied. Accordingly, the input device may adjust the sensitivity of the plurality of sensor electrodes only upon receiving the second input. In some aspects, the input device may acquire capacitive sensing information about the second input via the plurality of electrodes. The input device may then determine a capacitive sensing baseline for one or more of the sensor electrodes based at least in part on the capacitive sensing information about the second input.

BRIEF DESCRIPTION OF THE DRAWINGS

The present embodiments are illustrated by way of example and are not intended to be limited by the figures of the accompanying drawings.

DETAILED DESCRIPTION

Figure 1:
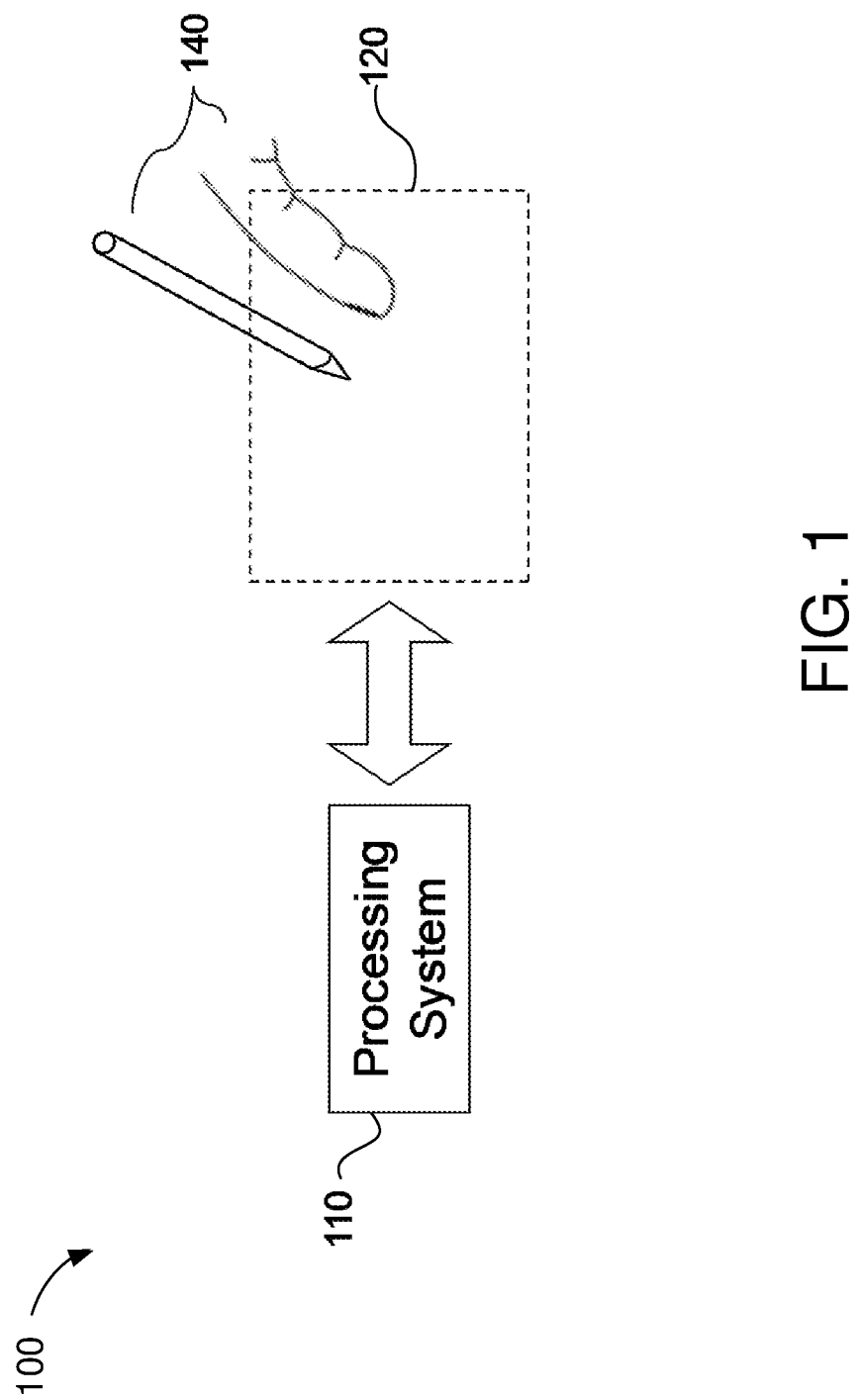
FIG. 1 shows an example input device within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general purpose processor, conventional processor, controller, microcontroller, and/or state machine capable of executing scripts or instructions of one or more software programs stored in memory.

FIG. 1 shows an example input device 100 within which the present embodiments may be implemented. The input device 100 includes a processing system 110 and a sensing region 120. The input device 100 may be configured to provide input to an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Examples technologies may include Inter-Integrated Circuit (I²C), Serial Peripheral Interface (SPI), PS/2, Universal Serial bus (USB), Bluetooth®, Infrared Data Association (IrDA), and various radio frequency (RF) communication protocols defined by the IEEE 802.11 standard.

In the example of FIG. 1, the input device 100 may correspond to a proximity sensor device (e.g., also referred to as a "touchpad" or "touch sensor device") configured to sense input provided by one or more input objects 140 in the sensing region 120. Example input objects 140 include fingers, styli, and the like. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some embodiments, the sensing region 120 may extend from a surface of the input device 100 in one or more directions in space, for example, until a signal-to-noise ratio (SNR) of the sensors falls below a threshold suitable for object detection. For example, the distance to which the sensing region 120 extends in a particular direction may be on the order of less than a millimeter, millimeters, centimeters, or more, and may vary with the type of sensing technology used and/or accuracy desired. In some embodiments, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof.

In some embodiments, input surfaces may be provided by, and/or projected on, one or more surfaces of a housing of the input device 100 (e.g., as an image). For example, the sensing region 120 may have a rectangular shape when projected onto an input surface of the input device 100. In some aspects, inputs may be provided through images spanning one, two, three, or higher dimensional spaces in the sensing region 120. In some other aspects, inputs may be provided through projections along particular axes or planes in the sensing region 120. Still further, in some aspects, inputs may be provided through a combination of images and projections in the sensing region 120.

The input device 100 may utilize various sensing technologies to detect user input. Example sensing technologies may include capacitive, elastive, resistive, inductive, magnetic, acoustic, ultrasonic, and optical sensing technologies. In some embodiments, the input device 100 may utilize capacitive sensing technologies to detect user inputs. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the sensing region 120. In some aspects, some sensor electrodes may be ohmically shorted together to form larger sensor electrodes. Some capacitive sensing technologies may utilize resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some embodiments, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes). In some aspects, each sensor electrode may either be a dedicated transmitter or a dedicated receiver. In other aspects, each sensor electrode may be configured to transmit and receive.

In some embodiments, the input device 100 may further detect a force exerted on an input surface coinciding with the sensing region 120. For example, the input device 100 may include one or more force sensors configured to generate force information representative of the force exerted by the input object 140 when making contact with the sensing region 120. In some aspects, the force information may be in the form of electrical signals representative of an amplitude (or change in amplitude) of the force applied to the input surface. For example, the force sensors may be formed, at least in part, by conductors provided on the input surface and a structure (such as a display screen) underlying the input surface. More specifically, the input surface may be configured to move (e.g., deflect and/or compress) relative to the underlying structure when a force is applied by the input object 140. The force sensors may produce electrical signals based on a change in capacitance, between the conductors, when the input surface moves relative to the underlying structure.

The processing system 110 may be configured to operate the hardware of the input device 100 to detect input in the sensing region 120. In some embodiments, the processing system 110 may control one or more sensor electrodes and/or force sensors to detect objects in the sensing region 120. For example, the processing system 110 may be configured to transmit signals via one or more transmitter sensor electrodes and receive signals via one or more receiver sensor electrodes. The processing system 110 may also be configured to receive force information via one or more force sensors. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 100 may be implemented as software executed by a central processing unit (CPU) of the computing device. In another example, the input device 100 may be physically integrated in a mobile device, and the processing system 110 may correspond, at least in part, to a CPU of the mobile device.

In some embodiments, the processing system 110 may be implemented as a set of modules that are implemented in firmware, software, or a combination thereof. Example modules include hardware operation modules for operating hardware such as sensor electrodes and display screens; data processing modules for processing data such as sensor signals and positional information; and reporting modules for reporting information. In some embodiments, the processing system 110 may include sensor operation modules configured to operate sensing elements to detect user input in the sensing region 120; identification modules configured to identify gestures such as mode changing gestures; and mode changing modules for changing operation modes of the input device 100 and/or electronic system.

The processing system 110 may respond to user input in the sensing region 120 by triggering one or more actions. Example actions include changing an operation mode of the input device 110 and/or graphical user interface (GUI) actions such as cursor movement, selection, menu navigation, and the like. In some embodiments, the processing system 110 may provide information about the detected input to the electronic system (e.g., to a CPU of the electronic system). The electronic system may then process information received from the processing system 110 to carry out additional actions (e.g., changing a mode of the electronic system and/or GUI actions).

The processing system 110 may operate the sensing elements of the input device 100 to produce electrical signals indicative of input (or lack of input) in the sensing region 120. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode.

In some embodiments, the processing system 110 may further determine positional information and/or force information for a detected input. The term "positional information," as used herein, refers to any information describing or otherwise indicating a position or location of the detected input (e.g., within the sensing region 120). Example positional information may include absolute position, relative position, velocity, acceleration, and/or other types of spatial information. Likewise, the term "force information," as used herein, refers to any information describing or otherwise indicating a force exerted by an input object in contact with a touch surface of the input device 100. For example, the force information may be provided as a vector or scalar quantity (e.g., indicating a direction and/or amplitude). As another example, the force information may include a time history component and/or describe whether the force exerted by the input object exceeds a threshold amount.

In some embodiments, the input device 100 may include a touch screen interface (e.g., display screen) that at least partially overlaps the sensing region 120. For example, the sensor electrodes of the input device 100 may form a substantially transparent overlay on the display screen, thereby providing a touch screen interface for the associated electronic system. The display screen may be any type of dynamic display capable of displaying a visual interface to a user. Examples of suitable display screen technologies may include light emitting diode (LED), organic LED (OLED), cathode ray tube (CRT), liquid crystal display (LCD), plasma, electroluminescence (EL), or other display technology.

In some embodiments, the input device 100 may share physical elements with the display screen. For example, one or more of the sensor electrodes may be used in displaying the interface and sensing inputs. More specifically, a sensor electrode used for sensing inputs may also operate as a display electrode used for displaying at least a portion of the interface. In some embodiments, the input device 100 may include a first sensor electrode configured for displaying at least part of the interface and sensing inputs, and a second sensor electrode may be configured for input sensing only. For example, the second sensor electrode may be disposed between substrates of the display device or may be external to the display device.

In some aspects, the display screen may be controlled or operated, at least in part, by the processing system 110. The processing system 110 may be configured to execute instructions related to sensing inputs and displaying the interface. For example, the processing system 110 may drive a display electrode to display at least a portion of the interface and sense user inputs, concurrently. In another example, the processing system 110 may drive a first display electrode to display at least a portion of the interface while concurrently driving a second display electrode to sense user inputs.

As described above, the processing system 110 may detect user input in the sensing region 120 based on changes in an electric field (or capacitance level) provided by corresponding sensor electrodes. More specifically, the processing system 110 may continuously (or periodically) detect the capacitance of a sensor electrode and compare the detected capacitance against a baseline capacitance level (e.g., corresponding to a state of the sensor electrode when no input is detected). The processing system 110 may sense a user input in a given portion of the sensing region 120 if the capacitance detected across one or more sensor electrodes in the given portion differs from their respective baselines by a threshold amount. Therefore, the accuracy and/or likelihood with which the processing system 110 is able to detect a user input may depend, at least in part, on the capacitive properties of the input object 140. For example, objects with "stronger" capacitive properties (e.g., causing greater changes in the electric field of the sensing region 120) are more likely to be detected than objects with "weaker" capacitive properties (e.g., causing relatively small changes in the electric field of the sensing region 120).

In some embodiments, the input device 100 may increase a sensitivity of the sensor electrodes to more accurately detect input objects with weaker capacitive properties. However, increasing the sensitivity of the sensor electrodes may also increase the susceptibility of the input device 100 to report "ghost" touches in the sensing region 120. For example, ghost touches may be caused by moisture, debris, and/or other unintended objects that may be present in the sensing region 120. The sensitivity of the sensor electrodes is typically configured to filter or prevent such unintended objects from being reported as ghost touches. Thus, increasing the sensitivity of the sensor electrodes beyond this sensitivity level may increase the likelihood and/or frequency with which the input device 100 is able to detect such unintended objects and report them as user inputs.

Aspects of the present disclosure may dynamically adjust the sensitivity of the sensor electrodes to adapt to the capacitive properties of an input object. As described in greater detail below, the input device 100 may detect when a user is attempting to use an input object with relatively weak capacitive properties (such as a gloved finger) to provide user inputs via the sensing region 120. In some embodiments, the input device 100 may detect the input object based, at least in part, on a force exerted on an input surface coinciding with the sensing region 120. For example, the input device 100 may determine that the input object correspond to an intentional user input when the force exerted on the input surface exceeds a force threshold. Upon detecting the presence of an input object with relatively weak capacitive properties, the input device 100 may increase the sensitivity of one or more sensor electrodes to ensure that subsequent inputs provided by the input object can be properly detected in the sensing region 120.

In some embodiments, the input device 100 may dynamically adjust the sensitivity of the sensor electrodes based, at least in part, on an amplitude and duration of the force exerted by the input object. As described above, operating the sensor electrodes with heightened sensitivity may increase the frequency and/or likelihood of ghost touches. Thus, it may be desirable to maintain the sensor electrodes at a lower sensitivity level whenever (and for as long as) possible. To prevent the input device 100 from accidentally or unintentionally increasing the sensitivity of the sensor electrodes, aspects of the present disclosure may require a "trigger condition" to be satisfied before the sensitivity level can be adjusted. In some aspects, the trigger condition may be satisfied when the force exerted on the input surface of the input device 100 exceeds the force threshold for at least a threshold duration. To further reduce the frequency and/or likelihood of ghost touches, the input device 100 may restore the sensitivity of the sensor electrodes to a prior configuration when no input is detected in the sensing region 120 for at least a threshold duration.

Among other advantages, the embodiments described herein allow for the detection of input objects with various capacitive properties. For example, by selectively increasing the sensitivity of the sensor electrodes only when an input object with relatively weak capacitive properties is being used to provide user input, the present embodiments may ensure proper detection of the input object while reducing the frequency and/or likelihood of reporting ghost touches. As described in greater detail below, the input device 100 may further use capacitive sensing information acquired for the input object (e.g., from one or more sensor electrodes) to determine the extent to which the sensitivity should be adjusted to ensure proper detection.

Figure 2:
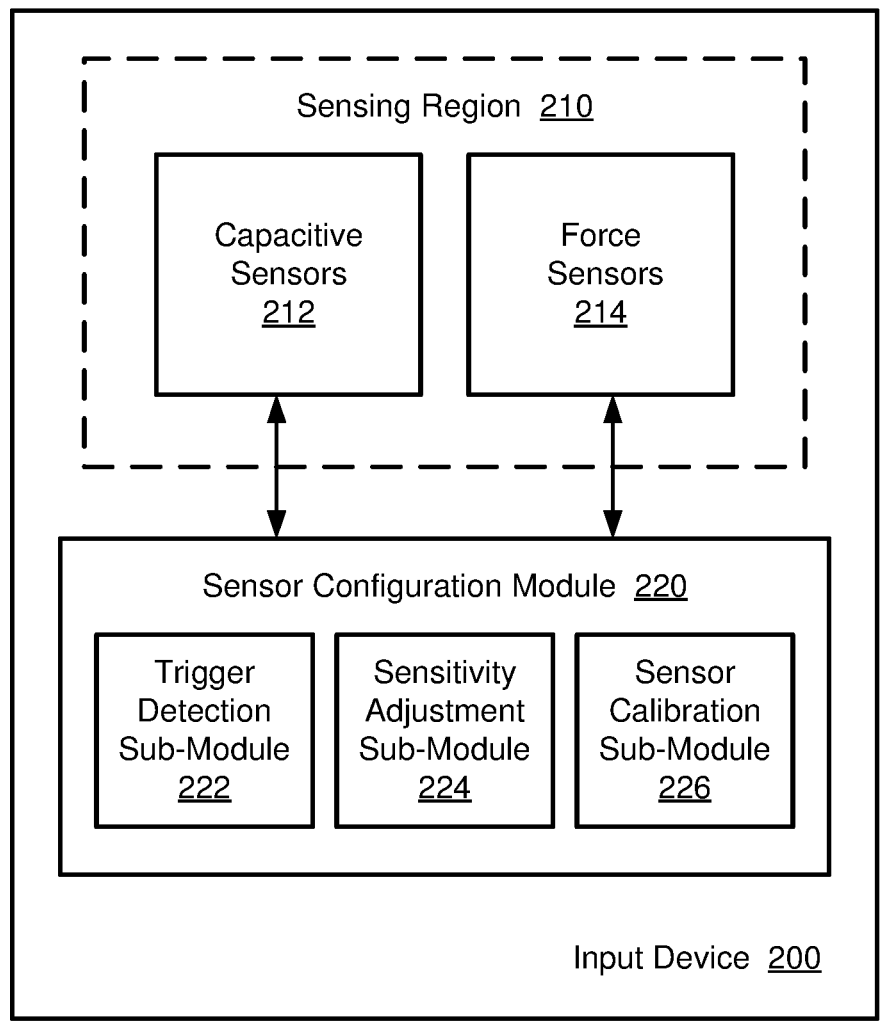
FIG. 2 is a block diagram of an input device capable of dynamically adjusting a sensitivity of one or more capacitive sensors, in accordance with some embodiments.

FIG. 2 is a block diagram of an input device 200 capable of dynamically adjusting a sensitivity of one or more capacitive sensors, in accordance with some embodiments. The input device 200 includes a sensing region 210 and a sensor configuration module 220. The sensing region 210 may encompass any space above, around, in, and/or proximate to the input device 200 in which the input device 200 is able to detect user input, such as provided by one or more input objects (not shown for simplicity). The size, shape, and/or location of the sensing region 210 may vary depending on actual implementations.

In some embodiments, the sensing region 210 includes, or is otherwise coupled to, a set of capacitive sensors 212 and force sensors 214. The capacitive sensors 212 may detect inputs in the sensing region 210 using capacitive sensing technologies (such as described above with respect to FIG. 1). For example, the capacitive sensors 212 may include an array of sensor electrodes that create an electric field in and/or around the sensing region 210. The input device 200 may detect inputs based on changes in a capacitance of the sensor electrodes and/or the electric field. The force sensors 214 may also be used to detect inputs and/or objects in the sensing region 210 using force sensing technologies (such as described above with respect to FIG. 1). For example, the force sensors 214 may be formed, at least in part, by conductors provided on an input surface coinciding with the sensing region 210 and a structure underlying the input surface. The input device 200 may detect a force exerted on the input surface based on changes in a capacitance of the conductors when the input surface moves (e.g., deflects and/or compresses) relative to the underlying structure.

The capacitive sensors 212 and force sensors 214 are coupled to the sensor configuration module 220. The sensor configuration module 220 may be implemented by, or include at least a portion of, a processing system (such as processing system 110) that controls an operation of the capacitive sensors 212 and/or force sensors 214. In some embodiments, the input detection module 220 may dynamically adjust a sensitivity of the capacitive sensors 212 based, at least in part, on force information received via the force sensors 214. In some aspects, the sensor configuration module 220 may include a trigger detection sub-module 222, a sensitivity adjustment sub-module 224, and a sensor calibration sub-module 226.

The trigger detection sub-module 222 may determine when a trigger condition, for adjusting the sensitivity of the capacitive sensors 212, is satisfied. For example, the trigger detection sub-module 222 may detect when a user is attempting to use an input object with relatively weak capacitive properties to provide user input in the sensing region 210. More specifically, the trigger detection sub-module 222 may enable the input device 200 to increase a sensitivity of the capacitive sensors 212 such that subsequent inputs provided by the input object can be properly detected using the capacitive sensors 212. As described above, increasing the sensitivity of the capacitive sensors 212 may also increase the likelihood and/or frequency of ghost touches being reported by the input device 200. Thus, the trigger condition may be further configured to prevent accidental or unintentional inputs in the sensing region 210 from causing the input device 200 to increase the sensitivity of the capacitive sensors 212.

In some embodiments, the trigger detection sub-module 222 may determine whether a trigger condition is satisfied based, at least in part, on force information received via the force sensors 214. For example, input objects with relatively weak capacitive properties (such as a gloved finger) may not be detectable by the capacitive sensors 212. Accordingly, the trigger detection sub-module 222 may rely on the force information to determine whether a sufficient amount of force has been exerted on an input surface (e.g., coinciding with the sensing region 210) of the input device 200 to correspond to a user input. To further prevent accidental or unintentional changes to the sensitivity of the capacitive sensors 212, the trigger detection sub-module 222 may require the force exerted on the input surface to be maintained for a sufficient amount of time. For example, this may correspond with a user pressing and holding a gloved finger firmly against the input surface until the trigger condition is satisfied. Thus, in some aspects, the trigger condition may be satisfied when an amplitude of the force exerted by the input object exceeds a force threshold for at least a threshold duration.

In some other embodiments, the trigger detection sub-module 222 may determine whether a trigger condition is satisfied based on the force information received via the force sensors 214 and sensor information received via the capacitive sensors 212. For example, when an input object exerts a threshold amount of force on an input surface of the input device 200, the trigger detection sub-module 222 may scan the capacitive sensors 212 to determine a capacitive property of the input object. If an input object has relatively strong capacitive properties (e.g., such that the input object is already detectable by the capacitive sensors 212), it may not be necessary to increase the sensitivity of the capacitive sensors 212 any further. Thus, the trigger detection sub-module 222 may enable the input device 200 to increase the sensitivity of the capacitive sensors 212 only when an input object with relatively weak capacitive properties is detected in the sensing region 210. In some aspects, the trigger condition may be satisfied when the amplitude of the force exerted by the input object exceeds the force threshold for at least the threshold duration and a capacitive property of the input object is below a capacitive threshold. In some example, the capacitive threshold may correspond with a capacitive property of a gloved finger.

The sensitivity adjustment sub-module 224 may dynamically adjust the sensitivity of the capacitive sensors 212 to detect input objects with various capacitive properties. For example, the sensitivity adjustment sub-module 224 may be configured to operate the capacitive sensors 212 in at least a "standard-sensitivity" mode and a "high-sensitivity" mode. When operating in the standard-sensitivity mode, the input device 200 may be configured to detect input objects with relatively strong capacitive properties (such as an ungloved finger), while ignoring input objects with weaker capacitive properties (such as a gloved finger). When operating in the high-sensitivity mode, the input device 200 may increase the sensitivity of the capacitive sensors 212 to detect input objects with weaker capacitive properties (e.g., that are otherwise undetectable in the standard-sensitivity mode). In some aspects, the sensitivity adjustment sub-module 224 may increase the sensitivity of the capacitive sensors 212 by lowering a capacitive sensing baseline for one or more sensor electrodes. This reduces the degree by which an input object must change the electric field or capacitance in the sensing region 210 in order to be properly detected by the capacitive sensors 212.

In some embodiments, the sensitivity adjustment sub-module 224 may be configured to increase the sensitivity of the capacitive sensors 212 when a trigger condition is satisfied. For example, the sensitivity adjustment sub-module 224 may change the configuration of the capacitive sensors 212 from the standard-sensitivity mode to the high-sensitivity mode when the trigger detection sub-module 222 determines that the trigger condition is satisfied. As described above, operating the capacitive sensors 212 in the high-sensitivity mode may increase the frequency and/or likelihood of detecting ghost touches in the sensing region 210. Thus, it may be desirable to maintain the capacitive sensors 212 in the standard-sensitivity mode whenever (and for as long as) possible. In some embodiments, the sensitivity adjustment sub-module 224 may be further configured to restore the sensitivity of the capacitive sensors 212 to a prior configuration when no input is detected in the sensing region 210 for at least a threshold duration. For example, the sensitivity adjustment sub-module 224 may initiate and/or reset an idle timer each time an input is detected in the sensing region 210 while operating in the high-sensitivity mode. When the idle timer expires (e.g., counts down to zero), the sensitivity adjustment sub-module 224 may change the configuration of the capacitive sensors 212 from the high-sensitivity mode to the standard-sensitivity mode. Accordingly, the standard-sensitivity mode may be configured as a "default" state for the capacitive sensors 212.

In some embodiments, the sensitivity adjustment sub-module 224 may request confirmation from a user of the input device 200 before changing the sensitivity of the capacitive sensors 212. For example, upon detecting that the trigger condition has been satisfied, the sensitivity adjustment sub-module 224 may prompt the user to confirm a desired increase in sensitivity by providing a subsequent input. In some aspects, the sensitivity adjustment sub-module 224 may generate the prompt in a graphical user interface (GUI) presented on a display screen (not shown) of the input device 200. In some aspects, the sensitivity adjustment sub-module 224 may switch to the high-sensitivity mode only if the user provides an affirmative response to the confirmation request. Otherwise, the sensitivity adjustment sub-module 224 may continue operating the capacitive sensors 212 in the standard-sensitivity mode. It is noted that the input object used to activate the trigger condition (e.g., hereinafter referred to as a "trigger object") may not be detectable by the capacitive sensors 212 in the standard-sensitivity mode. Thus, in some aspects, the sensitivity adjustment sub-module 224 may temporarily increase the sensitivity of the capacitive sensors 212 while waiting for a confirmation input from the user (e.g., while the prompt is presented on the display screen).

The sensor calibration sub-module 226 may calibrate the sensitivity of the capacitive sensors 212 to detect a trigger object. As described above, different input objects may have different capacitive properties. Thus, the extent to which the sensor calibration sub-module 226 should increase the sensitivity of the capacitive sensors 212 may depend on the capacitive properties of the particular trigger object. For example, too small of an increase in sensitivity may not be sufficient to detect a trigger object with very weak capacitive properties. On the other hand, too large of an increase in sensitivity may unnecessarily increase the frequency of ghost touches being reported by the capacitive sensors 212. Thus, in some aspects, the sensor calibration sub-module 226 may leverage sensor information acquired via the capacitive sensors 212 to determine the extent to which the sensitivity of the capacitive sensors 212 should be increased to accurately detect the trigger object, while limiting the detectability of unintended objects in the sensing region 210 (e.g. ghost touches). For example, the sensor calibration sub-module 226 may use the sensor information to determine a threshold at which to set the capacitive sensing baseline for the capacitive sensors 212.

In some embodiments, the sensor calibration sub-module 226 may acquire sensor information via the capacitive sensors 212 when a trigger condition is satisfied. For example, when the trigger detection sub-module 222 determines that a trigger condition has been satisfied, the sensor calibration sub-module 226 may scan the capacitive sensors 212 to determine a capacitive property of the trigger object. In some aspects, the sensor calibration sub-module 226 may leverage the sensor information acquired by the trigger detection sub-module 222 in determining whether the trigger condition has been satisfied (e.g., as described above). In some other embodiments, the sensor calibration sub-module 226 may acquire sensor information via the capacitive sensors 212 when a subsequent confirmation input is received. For example, it may be assumed that the subsequent confirmation input is also provided using the same trigger object that was used to activate the trigger condition. Still further, in some embodiments, the sensor calibration sub-module 226 may combine the sensor information acquired when the trigger condition is satisfied with additional sensor information acquired when the confirmation input is received to determine the capacitive properties of the trigger object.

Figure 3:
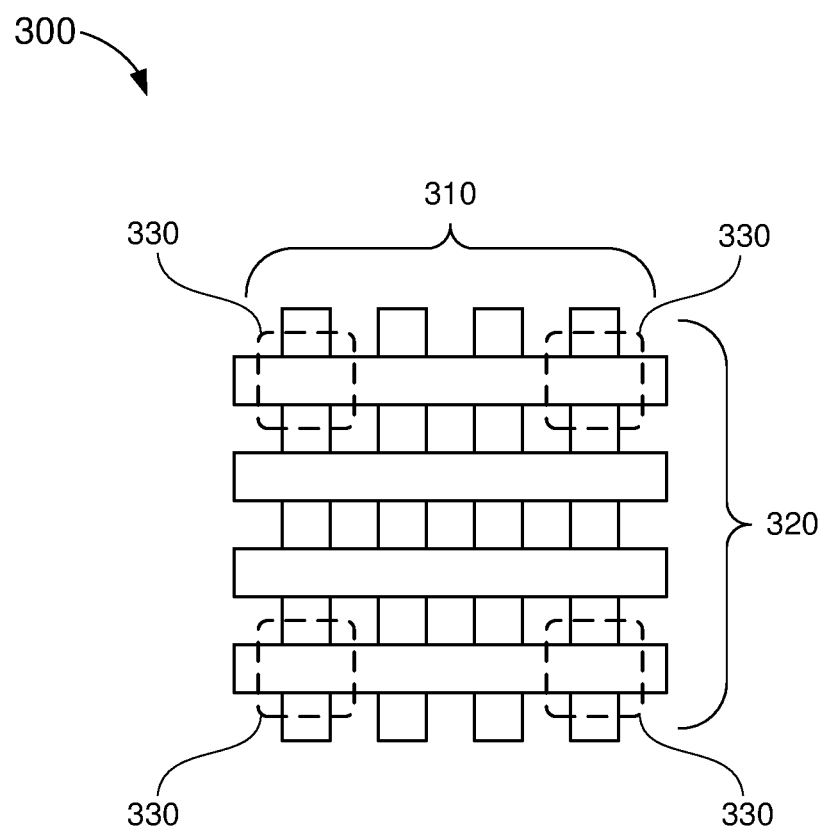
FIG. 3 shows an example sensor configuration that may provide at least part of the sensing region of an input device, in accordance with some embodiments.

FIG. 3 shows an example sensor configuration 300 that may provide at least part of the sensing region of an input device, in accordance with some embodiments. The sensor configuration 300 includes a capacitive sensor array formed by a number of sensor electrodes 310 arranged in a vertical pattern and a number of sensor electrodes 320 arranged in a horizontal patter, and a number of force sensing elements 330 disposed throughout the sensing region. In some embodiments, the sensor configuration 300 may represent at least a portion of the sensing region 210 of FIG. 2 and/or the sensing region 120 of FIG. 1. Accordingly, the sensor electrodes 310 and 320 may correspond to one or more of the capacitive sensors 212, and the force sensing elements 330 may correspond to one or more of the force sensors 214.

In some embodiments, the sensor electrodes 310 and 320 may be arranged on different sides of the same substrate. For example, the sensor electrodes 310 and 320 may be disposed on one surface of the substrate. In other embodiments, the sensor electrodes 310 and 320 may be arranged on different substrates. For example, the sensor electrodes 310 and 320 may be disposed on surfaces of different substrates that are adhered together. In another embodiment, the sensor electrodes 310 and 320 may be arranged on the same side or surface of a common substrate. For example, sensor electrodes 310 may include jumpers in region where the sensor electrodes 310 cross over sensor electrodes 320 (such that the jumpers are insulated from the sensor electrodes 320).

In the example of FIG. 3, sensor electrodes 310 are shown to extend in a first (e.g., vertical) direction and sensor electrodes 320 are shown to extend in a second (e.g., horizontal) direction. Although the sensor electrodes 310 and 320 are depicted in a perpendicular grid arrangement, in actual implementations the sensor electrodes 310 and 320 may be arranged in other patterns. For example, in other embodiments, the sensor electrodes 310 may be parallel or diagonal to the sensor electrodes 320. Furthermore, each of the sensor electrodes 310 and 320 is shown to have substantially the same shape and size. However, in other embodiments, the sensor electrodes 310 and 320 may be of various shapes and/or sizes.

A processing system (not shown for simplicity) may scan the array of sensor electrodes 310 and 320 to detect inputs in the sensing region. In some embodiments, the sensor electrodes 310 and 320 may be configured to implement absolute capacitive sensing techniques. For example, the processing system may drive one or more of the sensor electrodes 310 and/or 320 with modulated signals to determine changes in the absolute capacitance of the sensor electrodes. In other embodiments, the sensor electrodes 310 and 320 may be configured to implement transcapacitive sensing techniques. For example, the processing system may drive a transmitter signal on a first sensor electrode (e.g., of the sensor electrodes 310) and receive a resulting signal on a second sensor electrode (e.g., of the sensor electrodes 320).

A "capacitive pixel" may represent an area of localized capacitive coupling between sensor electrodes 310 and sensor electrodes 320. The capacitive coupling between sensor electrodes 310 and sensor electrodes 320 may change with a proximity and/or motion of input objects in the sensing region provided by the sensor configuration 300. A capacitive pixel may also represent an area of localized capacitance between an input object and sensor electrodes 310 or sensor electrodes 320. Thus, the absolute capacitance of the sensor electrodes 310 and/or 320 may change with a proximity and/or motion of an input object in the sensing region.

As described above, the accuracy with which the processing system is able to detect an input object in the sensing region may depend on the capacitive properties of the input object as well as the sensitivity of the sensor electrodes 310 and 320. For example, an object with relatively weak capacitive properties, when brought in contact with the sensing region, may have little effect on the capacitive coupling between any pair of sensor electrodes 310 and 320. Such small changes in capacitance may be filtered or ignored by the processing system if they are below a capacitive sensing baseline associated with the sensor electrodes 310 and 320. Thus, aspects of the present disclosure may dynamically adjust the capacitive sensing baseline for the sensor electrodes 310 and 320 to ensure that input objects with relatively weak capacitive properties can be properly detected by the input device.

In some embodiments, the processing system may leverage force information from the force sensing elements 330 to detect inputs in the sensing region. More specifically, the processing system may determine, based on the force information, whether a user intends to use an input object with relatively weak capacitive properties (such as a gloved finger) in providing user inputs via the sensing region. For example, the force sensors 330 may detect input objects in the sensing region (e.g., based on an amount of force exerted by the input object) that may otherwise be undetectable by the sensor electrodes 310 and 320 based on their current sensitivity level. In some aspects, the processing system may determine that an input object detected by the force sensors 330 corresponds to an intentional user input when the amount of force exerted by the input object (e.g., on an input surface of the input device) exceeds a force threshold.

In some embodiments, the force sensors 330 may be disposed in (or proximate to) the sensing region. In the example of FIG. 3, four force sensors 330 are shown in opposite corners of the sensing region, overlapping the sensor electrodes 310 and 320. However, in actual embodiments, the sensor configuration 300 may include fewer or more force sensors, in various other arrangements, than what is depicted in FIG. 3. Each of the force sensors 330 may be configured to measure an amount of force exerted on an input surface coinciding with the sensing region. In some aspects, each force sensor 330 may be formed from three layers of substrate. A first substrate layer may include a first electrode, a second substrate layer may include a second electrode, and a third substrate layer may be sandwiched between the first and second substrate layers to maintain a separation distance between the first electrode and the second electrode. For example, the third substrate layer may include an opening to expose at least a portion of the first electrode to the second electrode.

The first and second electrodes may form a variable capacitor. When a force is exerted on an input surface of the input device, the first substrate layer may deform and/or compress relative to the second substrate layer. This reduces the distance or gap between the first and second electrodes, which results in a change in capacitance across the electrodes. Specifically, the change in capacitance may be a function of the degree of movement of the first electrode relative to the second electrode. Thus, the change in capacitance may be directly correlated with the amount of force exerted on the input surface. The processing system may measure the change in capacitance of the first and second electrodes to determine force information about an input object in the sensing region.

In some embodiments, the processing system may use force information received via the force sensors 330 to dynamically adjust the sensitivity of the sensor electrodes 310 and 320. For example, the processing system may determine that a user is attempting to use an input object with relatively weak capacitive properties when the processing system receives force information from the force sensors 330 indicating at least a threshold amount of force being applied to an input surface of the input device, but the processing system is unable to detect a user input based on corresponding sensor information received from the sensor electrodes 310 and 320. Accordingly, the processing system may increase the sensitivity of the sensor electrodes 310 and 320 (e.g., by reducing a capacitive sensing baseline of one or more of the sensor electrodes 310 and 320) to accurately detect subsequent inputs provided by the input object. In some aspects, the processing system may ensure that the force exerted on the input surface remains above the force threshold for at least a threshold duration before increasing the sensitivity of the sensor electrodes 310 and 320 (e.g., to prevent accidentally or unintentionally increasing the sensitivity of the sensor electrodes).

In some other embodiments, the processing system may combine sensor information from the sensor electrodes 310 and 320 with force information from the force sensors 330 to determine how to calibrate (or re-calibrate) the sensor electrodes 310 and 320. For example, the processing system may use the sensor information acquired via the sensor electrodes 310 and 320, when the force exerted on the input surface exceeds the force threshold, to determine the capacitive properties of the input object. The processing system may then determine the extent to which the sensitivity of the sensor electrodes 310 and 320 should be increased to accurately detect the input object (e.g., without unnecessarily increasing the likelihood and/or frequency of reporting ghost touches). In some aspects, the processing system may configure the capacitive sensing baseline of the sensor electrodes 310 and 320 based on the capacitive properties of the input object.

Figure 4:
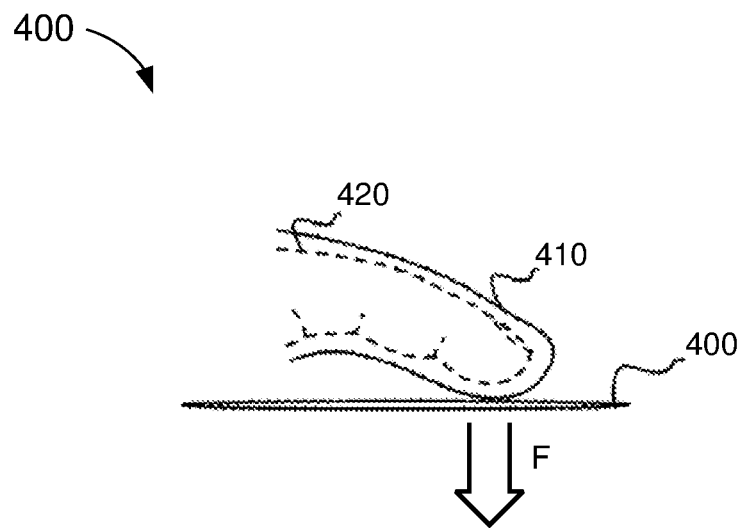
FIG. 4 shows a profile view of an example input object making contact with an input surface of an input device.

FIG. 4 shows a profile view 400 of an example input object making contact with an input surface of an input device. In the example of FIG. 4, the input object corresponds to a user's finger 420 inside a glove 410. More specifically, the glove 410 prevents the user's finger 420 from making direct contact with an input surface 400 (e.g., coinciding with a sensing region of the input device). Gloves are typically non-conductive and have a low dielectric constant. Thus, the glove 410 may substantially mask the capacitive properties of the finger 420 and impede the detectability of user inputs (e.g., provided using the gloved finger) on the input surface 400. When operating in a standard-sensitivity mode, the glove 410 may prevent the user's finger 420 from being detected on the input surface 400 using capacitive sensing techniques.

In some embodiments, the input device may adjust a sensitivity of one or more sensor electrodes (e.g., sensor electrodes 310 and 320 of FIG. 3) coupled to, or underlying, the input surface 400 to accommodate the weakened capacitive properties of the user's finger 420 (e.g., due to the glove 410). In some aspects, the input device may detect a force (F) exerted by the gloved finger based on force information received via one or more force sensors (e.g., force sensors 330 of FIG. 3) coupled to, or underlying, the input surface 400. For example, the input device may detect the presence of the gloved finger if the force exerted on the input surface exceeds a force threshold (e.g., for at least a threshold duration). The input device may subsequently increase the sensitivity one or more sensor electrodes to detect the gloved finger making contact with the input surface 400. In some embodiments, the input device may calibrate the sensitivity of the one or more sensor electrodes to more accurately detect the gloved finger based on the capacitive properties of the gloved finger (e.g., based on sensor information acquired via the one or more sensor electrodes).

In some embodiments, the input device may prompt the user to provide a subsequent confirmation input before increasing the sensitivity of the sensor electrodes. For example, the confirmation input may confirm or validate the user's desire to increase the sensitivity of the sensor electrodes. In some aspects, the input device may generate the prompt in a GUI presented on a display screen underlying the input surface 400. Accordingly, the input device may increase the sensitivity of the sensor electrodes only if the user provides an affirmative response to the prompt. Otherwise, the input device may maintain the current (e.g., default) sensitivity of the sensor electrodes. This may prevent the input device from accidentally or unintentionally increasing the sensitivity of the sensor electrodes, thus reducing the likelihood and/or frequency of ghost touches.

Figure 5:
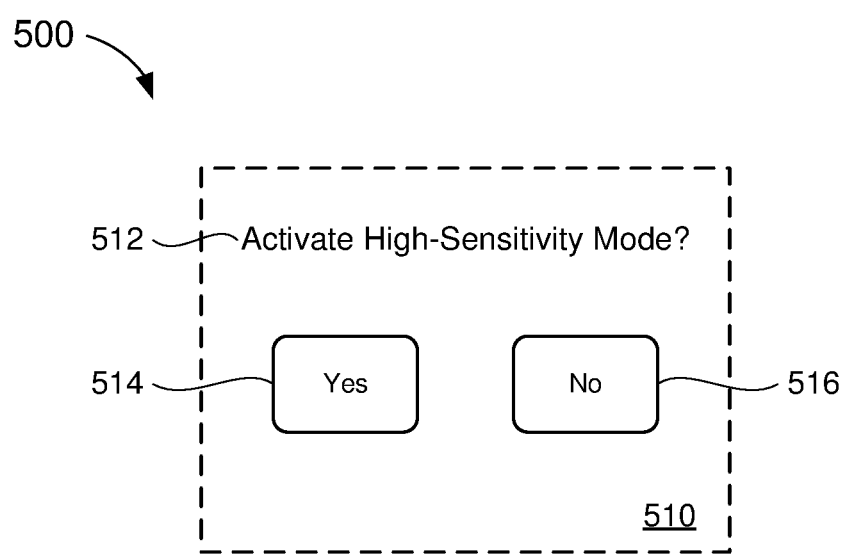
FIG. 5 shows an example graphical user interface that may be presented to a user of an input device.

FIG. 5 shows an example graphical user interface (GUI) 500 that may be presented to a user of an input device. For example, the GUI 500 may be displayed beneath the input surface 400 of FIG. 4. In some embodiments, the GUI 500 may be generated when a trigger condition is satisfied. For example, the trigger condition may be satisfied when the input device determines that a force exerted on the input surface 400 (such as by a gloved finger) exceeds a force threshold for at least a threshold duration. The GUI 500 includes a prompt 510 to confirm activation of a high-sensitivity mode. In the example of FIG. 5, the prompt 510 is shown to include a message 512 asking whether the user intends to activate the high-sensitivity mode (e.g., "Activate High-Sensitivity Mode?"), a first selectable icon 514 corresponding to an affirmative response (e.g., "Yes"), and a second selectable icon 516 corresponding a negative response (e.g., "No").

In some embodiments, the input device may increase the sensitivity of one or more sensor electrodes if the user selects (e.g., touches or taps) the first selectable icon 514. In some aspects, the input device may calibrate the sensitivity of the sensor electrodes to more accurately detect the input object used to select the first selectable icon 514 based on the capacitive properties of the input object (e.g., based on sensor information acquired via the one or more sensor electrodes when the first selectable icon 514 is selected). In some other embodiments, the input device may maintain the current (e.g., default) sensitivity of the sensor electrodes if the user selects (e.g., touches or taps) the second selectable icon 516. Still further, in some embodiments, the input device may maintain the current sensitivity of the sensor electrodes if no user input is received (e.g., neither of the selectable icons 514 or 516 is selected) within a threshold duration after the GUI 500 is generated.

In some embodiments, the input device may display the prompt 510 each time the trigger condition is satisfied. For example, the input device may request a user confirmation any time the input device is about to switch from a standard-sensitivity mode to a high-sensitivity mode. In some other embodiments, the input device may not display the prompt 510 again once the user has provided a confirmation input. For example, the input device may display the prompt 510 the first time the trigger condition is satisfied after powering on the input device. If the user selects the first selectable icon 514, the input device may refrain from displaying the prompt 510 again any time the trigger condition is subsequently satisfied. More specifically, the input device may immediately increase the sensitivity of the sensor electrodes (e.g., without displaying the prompt 510) each subsequent time the trigger condition is satisfied. Still further, in some embodiments, the input device may display the prompt 510 again (e.g., even after the user has provided a confirmation input) if a threshold amount of time has elapsed since the last time the prompt 510 was displayed. In yet another embodiment, the input device may display the prompt 510 again after bypassing the prompt a threshold number of times (e.g., in which the trigger condition was satisfied).

Figure 6:
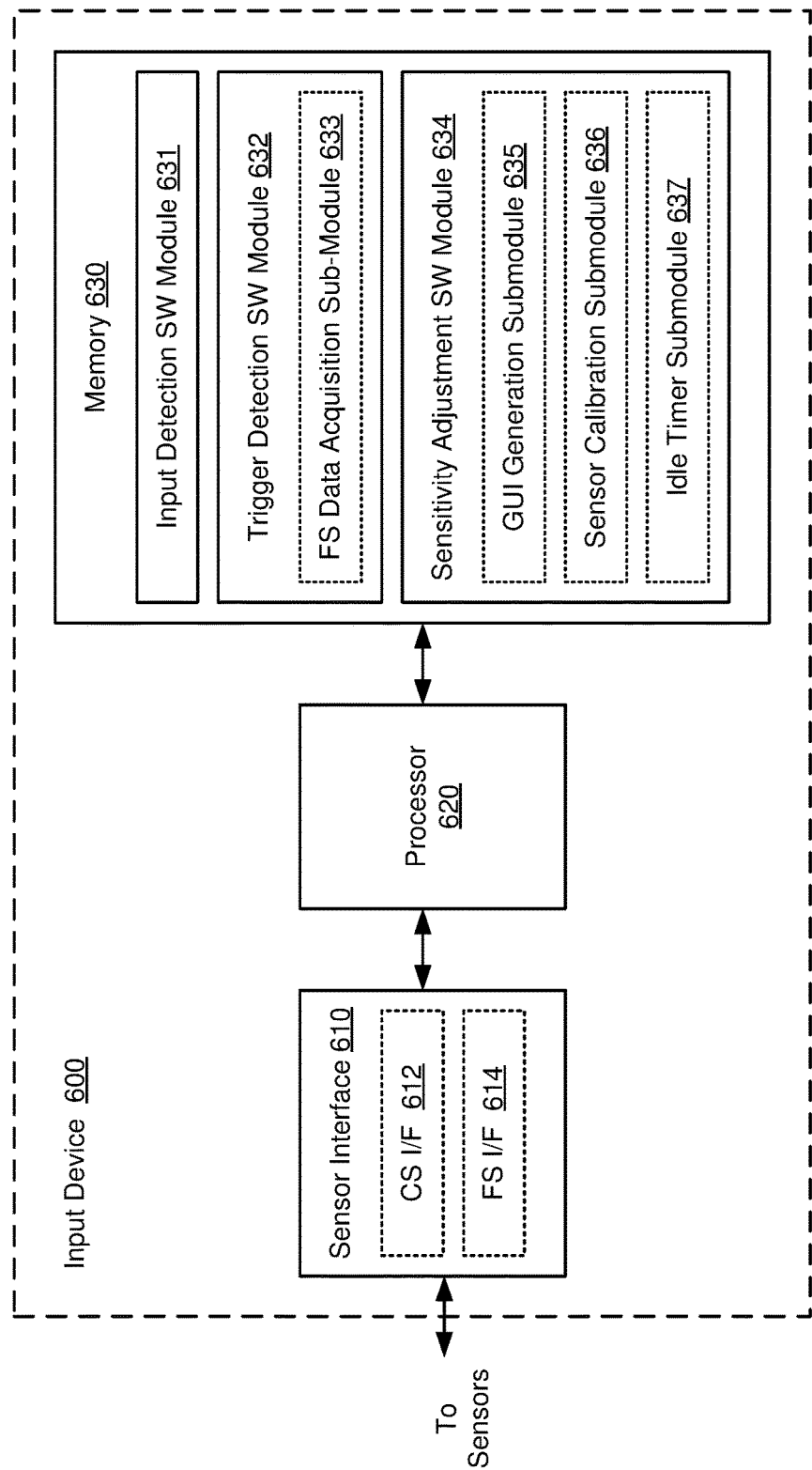
FIG. 6 is a block diagram of an input device capable of dynamically adjusting a sensitivity of one or more capacitive sensors, in accordance with some other embodiments.

FIG. 6 is a block diagram of an input device 600 capable of dynamically adjusting a sensitivity of one or more capacitive sensors, in accordance with some other embodiments. The input device 600 may be an embodiment of the input device 100 of FIG. 1 and/or the input device 200 of FIG. 2. In some embodiments, the input device 600 may include a sensor interface 610, a processor 620, and a memory 630.

The sensor interface 610 may include a capacitive sensor interface 612 and a force sensor interface 614. The capacitive sensor interface 612 may be used to communicate with one or more capacitive sensors of the input device 600 (such as capacitive sensors 212 of FIG. 2 and/or sensor electrodes 310 and 320 of FIG. 3). For example, the capacitive sensor interface 612 may transmit signals to, and receive signals from, one or more capacitive sensors to detect inputs in a sensing region of the input device 600. The force sensor interface 614 may be used to communicate with one or more force sensors of the input device 600 (such as force sensors 214 of FIG. 2 and/or force sensors 330 of FIG. 3). For example, the force sensor interface 614 may receive force information from one or more force sensors to detect a force exerted on an input surface (e.g., coinciding with the sensing region) of the input device.

The memory 630 may include a non-transitory computer-readable medium (e.g., one or more nonvolatile memory elements, such as EPROM, EEPROM, Flash memory, a hard drive, etc.) that may store at least the following software (SW) modules:

an input detection SW module 631 to detect inputs in the sensing region of the input device 600 based on information received via the sensor interface 610;

a trigger detection SW module 632 to determine when a trigger condition has been satisfied for changing a sensitivity of the capacitive sensors, the trigger detection SW module 632 including:

a force sensor (FS) data acquisition sub-module 633 to acquire force information, from one or more force sensors, about an input object in the sensing region of the input device 600; and a sensitivity adjustment SW module 634 to dynamically adjust the sensitivity of the capacitive sensors based, at least in part, on the trigger condition, the sensitivity adjustment SW module 634 including:

a graphical user interface (GUI) generation sub-module 635 to prompt a user to confirm an increase in sensitivity of the capacitive sensors;

a sensor calibration sub-module 636 to calibrate the sensitivity of the capacitive sensors based on a capacitive property of the input object; and an idle timer sub-module 637 to restore the sensitivity of the capacitive sensors to a prior (e.g., default) configuration when no input is detected in the sensing region for at least a threshold duration.

Each software module includes instructions that, when executed by the processor 620, cause the input device 600 to perform the corresponding functions. The non-transitory computer-readable medium of memory 630 thus includes instructions for performing all or a portion of the operations described below with respect to FIGS. 7-9.

Processor 620 may be any suitable one or more processors capable of executing scripts or instructions of one or more software programs stored in the input device 600 (e.g., within memory 630). For example, the processor 620 may execute the input detection SW module 631 to detect inputs in the sensing region of the input device 600 based on information received via the sensor interface 610. The processor 620 may also execute the trigger detection SW module 632 to determine when a trigger condition has been satisfied for changing a sensitivity of the capacitive sensors. In executing the trigger detection SW module 632, the processor 630 may further execute the FS data acquisition sub-module 633 to acquire force information, from one or more force sensors, about an input object in the sensing region of the input device 600.

Still further, the processor 620 may execute the sensitivity adjustment SW module 634 to dynamically adjust the sensitivity of the capacitive sensors based, at least in part, on the trigger condition. In executing the sensitivity adjustment SW module 634, the processor 620 may further execute the GUI generation sub-module 635, the sensor calibration sub-module 636, and the idle timer sub-module 637. For example, the processor 620 may execute the GUI generation sub-module 635 to prompt a user to confirm an increase in the sensitivity of the capacitive sensors. The processor 620 also may execute the sensor calibration sub-module 636 to calibrate the sensitivity of the capacitive sensors based on a capacitive property of the input object. Further, the processor 620 may execute the idle timer sub-module 637 to restore the sensitivity of the capacitive sensors to a prior (e.g., default) configuration when no input is detected in the sensing region for at least a threshold duration.

Figure 7:
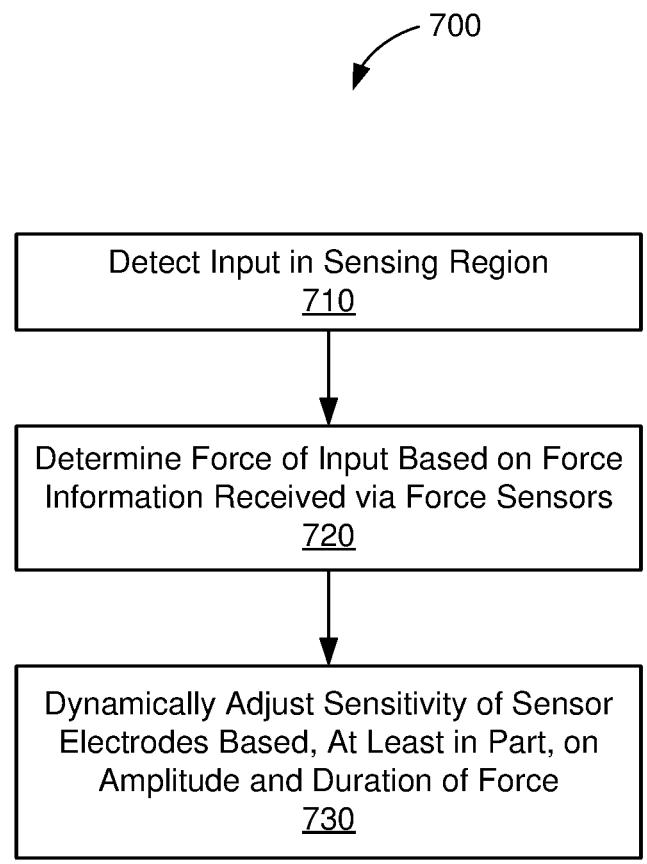
FIG. 7 is an illustrative flowchart depicting an example operation for dynamically adjusting a sensitivity of one or more capacitive sensors, in accordance with some embodiments.

FIG. 7 is an illustrative flowchart depicting an example operation 700 for dynamically adjusting a sensitivity of one or more capacitive sensors, in accordance with some embodiments. With reference for example to FIG. 2, the operation 700 may be performed by the input device 200 to adjust the sensitivity of the capacitive sensors 212 based, at least in part, on force information received via the force sensors 214. More specifically, the operation 700 may be enable the capacitive sensors 212 to detect input objects with various capacitive properties, including input objects (such as a gloved finger) with relatively weak capacitive properties.

The input device 200 first detects an input in the sensing region 210 (710). In some aspects, the input may not be detectable by the capacitive sensors 212. For example, the input may be provided by an input object with relatively weak capacitive properties (such as a gloved finger). More specifically, the capacitive properties of the input object may be too weak to be detected (e.g., as user inputs) based on a current sensitivity of the capacitive sensors 212. Thus, in some embodiments, the input device 200 may rely on the force sensors 214 to detect inputs in the sensing region 210. For example, the input device 200 may determine whether a sufficient amount of force has been exerted on an input surface (e.g., coinciding with the sensing region 210) to correspond to a user input.

The input device 200 may determine a force of the input based on force information received via the force sensors 214 (720). For example, the force sensors 214 may be formed, at least in part, by conductors provided on the input surface and a structure (e.g., substrate layer) underlying the input surface. A force exerted on the input surface causes the input surface to move (e.g., deflect and/or compress) relative to the underlying structure, creating a change in capacitance across the corresponding conductors. The force information received via the force sensors 214 may indicate this change in capacitance. More specifically, the change in capacitance may be directly correlated to the amount (e.g., amplitude) of force exerted on the input surface of the input device 200.

The input device 200 may then dynamically adjust a sensitivity of one or more sensor electrodes based, at least in part, on an amplitude and duration of the force exerted on the input surface (730). For example, the input device 200 may increase the sensitivity of one or more sensor electrodes (e.g., of the capacitive sensors 212) to more accurately detect input objects with weaker capacitive properties. In some aspects, the input device 200 may increase the sensitivity of the sensor electrodes by lowering a capacitive sensing baseline for the sensor electrodes. However, increasing the sensitivity of the sensor electrodes may also increase a likelihood and/or frequency of reporting ghost touches. Thus, it may be desirable to ensure that a user is attempting to use an object with relatively weak capacitive properties (such as a gloved finger) to provide user inputs via the sensing region 210 before increasing the sensitivity of the sensor electrodes.

To prevent accidentally or unintentionally increasing the sensitivity of the sensor electrodes, the input device 200 may require a trigger condition to be satisfied before increasing the sensitivity of the sensor electrodes. In some embodiments, the trigger condition may be satisfied when the force exerted on the input surface exceeds a force threshold for at least a threshold duration. In some other embodiments, the trigger condition may be satisfied only when the force exerted on the input surface exceeds the force threshold for at least the threshold duration and a capacitive property of the input object is below a capacitive threshold (e.g., to ensure that the input object has relatively weak capacitive properties). Still further, in some embodiments, the input device 200 may restore the sensitivity of the sensor electrodes to a prior configuration when no input is detected in the sensing region 210 for at least a threshold duration.

Figure 8:
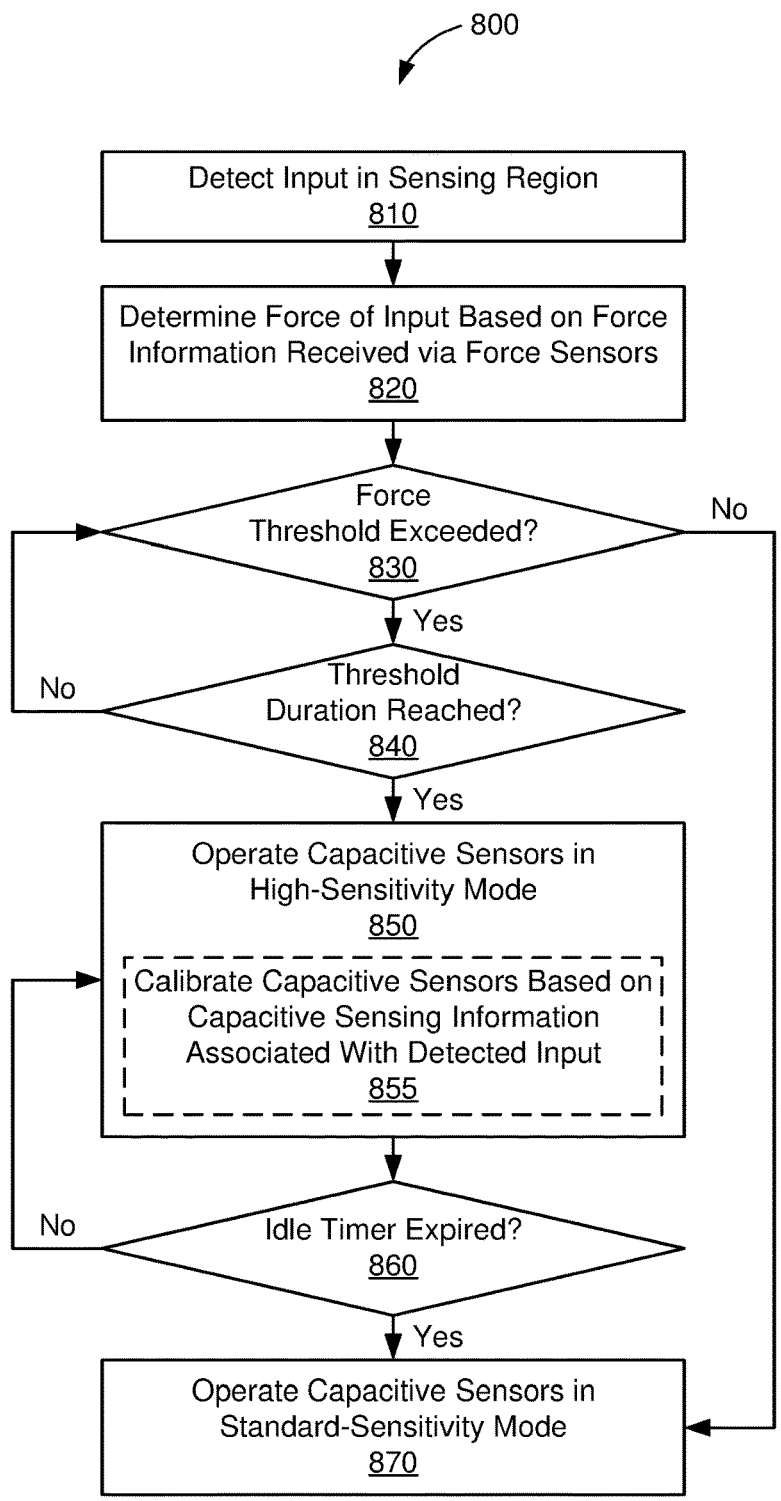
FIG. 8 is an illustrative flowchart depicting an example operation for adjusting a sensitivity of one or more capacitive sensors based, at least in part, on force information received via one or more force sensors.

FIG. 8 is an illustrative flowchart depicting an example operation 800 for adjusting a sensitivity of one or more capacitive sensors based, at least in part, on force information received via one or more force sensors. With reference for example to FIG. 2, the operation 800 may be performed by the input device 200 to adjust the sensitivity of the capacitive sensors 212 based, at least in part, on force information received via the force sensors 214. In some embodiments, the capacitive sensors 212 may be configured to operate in at least a standard-sensitivity mode and a high-sensitivity mode.

The input device 200 first detects an input in the sensing region 210 (810). In some aspects, the input may not be detectable by the capacitive sensors 212. For example, the input may be provided by an input object with relatively weak capacitive properties (such as a gloved finger). More specifically, the capacitive properties of the input object may be too weak to be detected (e.g., as user inputs) based on a current sensitivity of the capacitive sensors 212. Thus, in some embodiments, the input device 200 may rely on the force sensors 214 to detect inputs in the sensing region 210. For example, the input device 200 may determine whether a sufficient amount of force has been exerted on an input surface (e.g., coinciding with the sensing region 210) to correspond to a user input.

The input device 200 may determine a force of the input based on force information received via the force sensors 214 (820). For example, the force sensors 214 may be formed, at least in part, by conductors provided on the input surface and a structure underlying the input surface. A force exerted on the input surface causes the input surface to move (e.g., deflect and/or compress) relative to the underlying structure, creating a change in capacitance across the corresponding conductors. The force information received via the force sensors 214 may indicate this change in capacitance. More specifically, the change in capacitance may be directly correlated to the amount (e.g., amplitude) of force exerted on the input surface.

The input device 200 then determines whether an amplitude of the force exceeds a force threshold (830). For example, the trigger detection sub-module 222 may require the user to press down on the input surface (e.g., using the input object) with a sufficient amount of force to prevent the input device 200 from accidentally or unintentionally increasing the sensitivity of the capacitive sensors 212. If the amplitude of the force does not exceed the force threshold (as tested at 830), the input device 200 may continue operating the capacitive sensors 212 in the standard-sensitivity mode (870). When operating in the standard-sensitivity mode, the input device 200 may be configured to detect input objects with relatively strong capacitive properties (such as an ungloved finger), while ignoring input objects with weaker capacitive properties (such as a gloved finger).

If the amplitude of the force exceeds the force threshold (as tested at 830), the input device 200 may further determine whether the force has been maintained for at least a threshold duration (840). For example, the trigger detection sub-module 222 may require the user to press and hold down on the input surface for a sufficient amount of time to further prevent the input device 200 from accidentally or unintentionally increasing the sensitivity of the capacitive sensors 212. If, at any time before the threshold duration is reached (as tested at 840), the amplitude of the force falls below the force threshold (as tested at 830), the input device 200 may continue operating the capacitive sensors 212 in the standard-sensitivity mode (870).

If the amplitude of the force remains above the force threshold (as tested at 830) for at least the threshold duration (as tested at 840), the input device 200 may subsequently operate the capacitive sensors 212 in the high-sensitivity mode (850). When operating in the high-sensitivity mode, the input device 200 may increase the sensitivity of the capacitive sensors 212 to detect input objects with relatively weak capacitive properties (e.g., that may be otherwise undetectable in the standard-sensitivity mode). In some embodiments, the sensitivity adjustment sub-module 224 may increase the sensitivity of the capacitive sensors 212 by lowering a capacitive sensing baseline for the capacitive sensors 212. This reduces the degree by which an input object must change the electric field or capacitance in the sensing region 210 to be accurately detected by the capacitive sensors 212.

In some embodiments, the input device 200 may calibrate the sensitivity of the capacitive sensors 212 based on capacitive sensing information associated with the detected input (855). For example, different input objects may have different capacitive properties. Thus, the extent to which the input device 200 should increase the sensitivity of the capacitive sensors 212 may depend on the capacitive properties of the particular input object being used. In some embodiments, the sensor calibration sub-module 226 may acquire sensor information, via the capacitive sensors 212, when the force exerted on the input surface exceeds the force threshold for at least the threshold duration (as tested at 830 and 840). The sensor calibration sub-module 226 may thus leverage the sensor information about the detected input to determine the extent to which the sensitivity of the capacitive sensors 212 should be increased to accurately detect the particular input object, while limiting the detectability of unintended objects in the sensing region 210 (e.g., ghost touches).

While operating in the high-sensitivity mode, the input device 200 may determine whether an idle timer has expired (860). For example, operating the capacitive sensors 212 in the high-sensitivity mode may increase the frequency and/or likelihood of detecting ghost touches in the sensing region 210. Thus, it may be desirable to maintain the capacitive sensors 212 in the standard-sensitivity mode whenever (and for as long as) possible. In some embodiments, the sensitivity adjustment sub-module 224 may initiate and/or reset an idle timer each time an input is detected in the sensing region 210 while operating in the high-sensitivity mode. As long as the idle timer has not yet expired (as tested at 860), the input device 200 may continue operating the capacitive sensors 212 in the high-sensitivity mode (850). However, once the idle timer expires (as tested at 860), the input device 200 may revert back to operating the capacitive sensors 212 in the standard-sensitivity mode (870).

Figure 9:
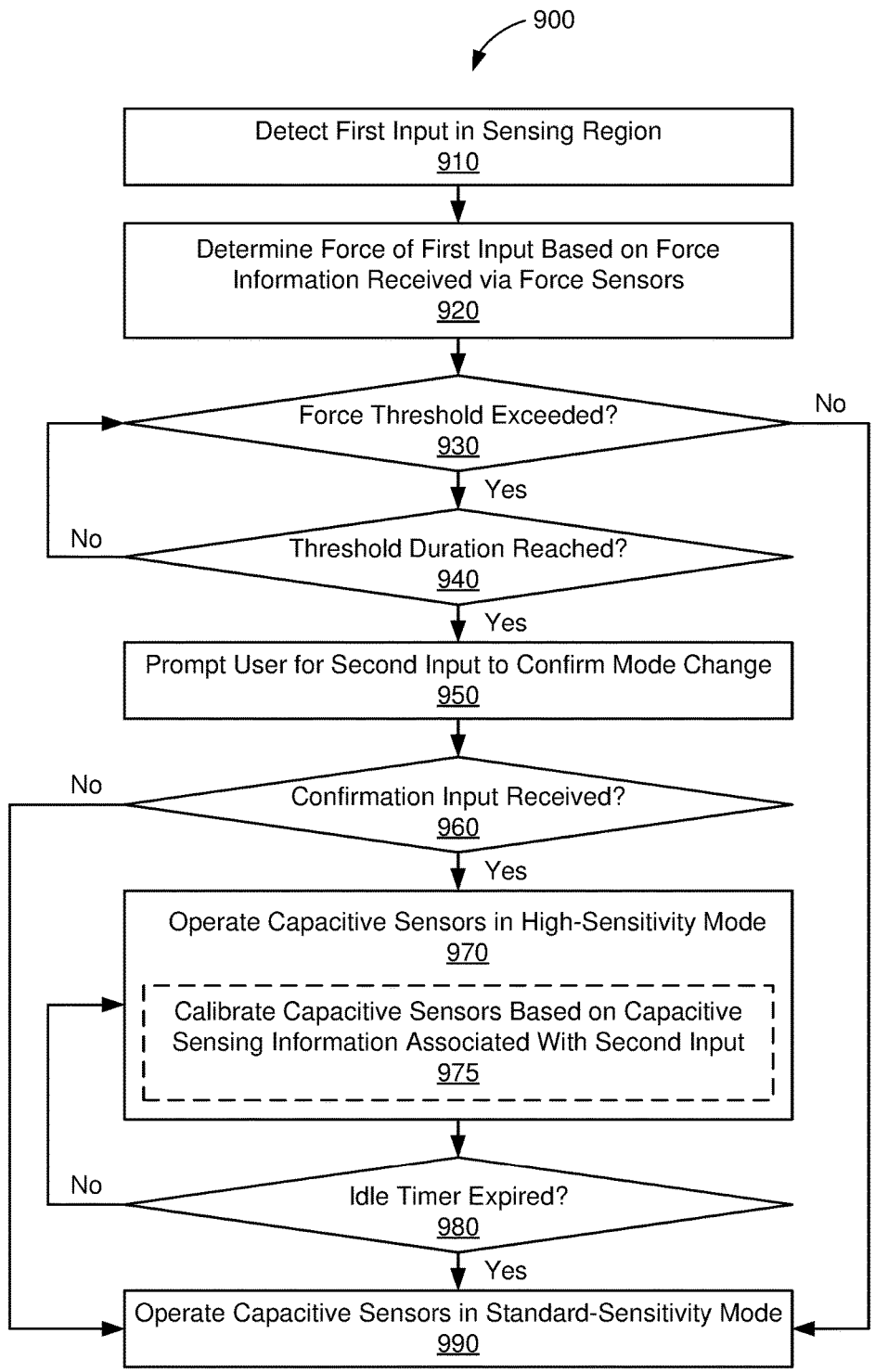
FIG. 9 is an illustrative flowchart depicting another example operation for adjusting a sensitivity of one or more capacitive sensors based, at least in part, on force information received via one or more force sensors.

FIG. 9 is an illustrative flowchart depicting another example operation 900 for adjusting a sensitivity of one or more capacitive sensors based, at least in part, on force information received via one or more force sensors. With reference for example to FIG. 2, the operation 900 may be performed by the input device 200 to adjust the sensitivity of the capacitive sensors 212 based, at least in part, on force information received via the force sensors 214. In some embodiments, the capacitive sensors may be configured to operate in at least a standard-sensitivity mode and a high-sensitivity mode.

The input device 200 first detects an input in the sensing region 210 (910). In some aspects, the input may not be detectable by the capacitive sensors 212. For example, the input may be provided by an input object with relatively weak capacitive properties (such as a gloved finger). More specifically, the capacitive properties of the input object may be too weak to be detected (e.g., as user inputs) based on a current sensitivity of the capacitive sensors 212. Thus, in some embodiments, the input device 200 may rely on the force sensors 214 to detect inputs in the sensing region 210. For example, the input device 200 may determine whether a sufficient amount of force has been exerted on an input surface (e.g., coinciding with the sensing region 210) to correspond to a user input.

The input device 200 may determine a force of the input based on force information received via the force sensors 214 (920). For example, the force sensors 214 may be formed, at least in part, by conductors provided on the input surface and a structure underlying the input surface. A force exerted on the input surface causes the input surface to move (e.g., deflect and/or compress) relative to the underlying structure, creating a change in capacitance across the corresponding conductors. The force information received via the force sensors 214 may indicate this change in capacitance. More specifically, the change in capacitance may be directly correlated to the amount (e.g., amplitude) of force exerted on the input surface.

The input device 200 then determines whether an amplitude of the force exceeds a force threshold (930). For example, the trigger detection sub-module 222 may require the user to press down on the input surface (e.g., using the input object) with a sufficient amount of force to prevent the input device 200 from accidentally or unintentionally increasing the sensitivity of the capacitive sensors 212. If the amplitude of the force does not exceed the force threshold (as tested at 930), the input device 200 may continue operating the capacitive sensors 212 in the standard-sensitivity mode (990). When operating in the standard-sensitivity mode, the input device 200 may be configured to detect input objects with relatively strong capacitive properties (such as an ungloved finger), while ignoring input objects with weaker capacitive properties (such as a gloved finger).

If the amplitude of the force exceeds the force threshold (as tested at 930), the input device 200 may further determine whether the force has been maintained for at least a threshold duration (940). For example, the trigger detection sub-module 222 may require the user to press and hold down on the input surface for a sufficient amount of time to further prevent the input device 200 from accidentally or unintentionally increasing the sensitivity of the capacitive sensors 212. If, at any time before the threshold duration is reached (as tested at 940), the amplitude of the force falls below the force threshold (as tested at 930), the input device 200 may continue operating the capacitive sensors 212 in the standard-sensitivity mode (990).

If the amplitude of the force remains above the force threshold (as tested at 930) for at least the threshold duration (as tested at 940), the input device 200 may subsequently prompt the user for a second input to confirm a mode change operation (950). For example, the sensitivity adjustment sub-module 224 may require the user to confirm a desired increase in sensitivity before adjusting the sensitivity of the capacitive sensors 212. In some embodiments, the sensitivity adjustment sub-module 224 may generate the prompt in a GUI presented on a display screen underlying the input surface (e.g., GUI 500 of FIG. 5). In some aspects, the prompt may be displayed each time before increasing the sensitivity of the capacitive sensors 212. In some other aspects, the prompt may not be displayed again (e.g., a subsequent time) after a confirmation input has been received from the user. Still further, in some aspects, the prompt may be displayed again only after a threshold amount of time has elapsed, and/or the input device 200 has switched to the high-sensitivity mode a threshold number of times, since the previous time the prompt was displayed.

The input device 200 determines whether the user provides a subsequent input confirming the increase in sensitivity (960). For example, the confirmation input may correspond to the user providing an affirmative response to the prompt (e.g., by touching or tapping the first selectable icon 514 in the GUI 500). If the input device 200 does not receive a confirmation input from the user (as tested at 960), the input device 200 may continue operating the capacitive sensors 212 in the standard-sensitivity mode (990). For example, the sensitivity adjustment sub-module 224 may refrain from increasing the sensitivity of the capacitive sensors 212 if the user provides a negative response (e.g., by touching or tapping the second selectable icon 516 in the GUI 500) and/or does not respond within a threshold period of time.

If the input device 200 receives a confirmation input from the user (as tested at 960), the input device 200 may subsequently operate the capacitive sensors 212 in the high-sensitivity mode (970). When operating in the high-sensitivity mode, the input device 200 may increase the sensitivity of the capacitive sensors 212 to detect input objects with relatively weak capacitive properties (e.g., that may be otherwise undetectable in the standard-sensitivity mode). In some embodiments, the sensitivity adjustment sub-module 224 may increase the sensitivity of the capacitive sensors 212 by lowering a capacitive sensing baseline for the capacitive sensors 212. This reduces the degree by which an input object must change the electric field or capacitance in the sensing region 210 to be accurately detected by the capacitive sensors 212.

In some embodiments, the input device 200 may calibrate the sensitivity of the capacitive sensors 212 based on capacitive sensing information associated with the detected input (975). For example, different input objects may have different capacitive properties. Thus, the extent to which the input device 200 should increase the sensitivity of the capacitive sensors 212 may depend on the capacitive properties of the particular input object being used. In some embodiments, the sensor calibration sub-module 226 may acquire sensor information, via the capacitive sensors 212, when the confirmation input is received form the user (as tested at 960). The sensor calibration sub-module 226 may thus leverage the sensor information about the confirmation input to determine the extent to which the sensitivity of the capacitive sensors 212 should be increased to accurately detect the particular input object, while limiting the detectability of unintended objects in the sensing region 210 (e.g., ghost touches).

While operating in the high-sensitivity mode, the input device 200 may determine whether an idle timer has expired (980). For example, operating the capacitive sensors 212 in the high-sensitivity mode may increase the frequency and/or likelihood of detecting ghost touches in the sensing region 210. Thus, it may be desirable to maintain the capacitive sensors 212 in the standard-sensitivity mode whenever (and for as long as) possible. In some embodiments, the sensitivity adjustment sub-module 224 may initiate and/or reset an idle timer each time an input is detected in the sensing region 210 while operating in the high-sensitivity mode. As long as the idle timer has not yet expired (as tested at 980), the input device 200 may continue operating the capacitive sensors 212 in the high-sensitivity mode (970). However, once the idle timer expires (as tested at 980), the input device 200 may revert back to operating the capacitive sensors 212 in the standard-sensitivity mode (990).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An input device comprising:
a plurality of sensor electrodes configured for capacitive sensing in a sensing region of the input device;
one or more force sensors coupled to the sensing region;
processing circuitry; and
a memory storing instructions that, when executed by the processing circuitry, cause the input device to:
detect a first input in the sensing region;
determine a force of the first input based on force information received via the one or more force sensors; and
dynamically increase a sensitivity of the plurality of sensor electrodes in response to an amplitude of the force exceeding a force threshold for at least a first threshold duration.

2. The input device of claim 1, wherein execution of the instructions further causes the input device to:
detect that a trigger condition is satisfied, at least in part, when the amplitude of the force exceeds the force threshold for at least the first threshold duration.

3. The input device of claim 2, wherein execution of the instructions further causes the input device to:
acquire capacitive sensing information about the first input via the plurality of sensor electrodes; and
determine, based on the capacitive sensing information, that a capacitive property of the first input is below a capacitive threshold.

4. The input device of claim 3, wherein the capacitive threshold is associated with a capacitive property of a gloved finger.

5. The input device of claim 3, wherein the trigger condition is satisfied when the amplitude of the force exceeds the force threshold for at least the first threshold duration and the capacitive property of the first input is below the capacitive threshold.

6. The input device of claim 3, wherein execution of the instructions further causes the input device to:
determine a capacitive sensing baseline for one or more of the sensor electrodes, when the trigger condition is satisfied, based at least in part on the capacitive sensing information about the first input.

7. The input device of claim 2, wherein execution of the instructions further causes the input device to:
   request a second input from a user of the input device when the trigger condition is satisfied; and
   adjust the sensitivity of the plurality of sensor electrodes upon receiving the second input.

8. The input device of claim 7, wherein execution of the instructions further causes the input device to:
   acquire capacitive sensing information about the second input via the plurality of sensor electrodes; and
   determine a capacitive sensing baseline for one or more of the sensor electrodes based at least in part on the capacitive sensing information about the second input.

9. The input device of claim 1, wherein the execution of the instructions to dynamically adjust the sensitivity of the plurality of sensor electrodes further causes the input device to:
   restore the sensitivity of the plurality of sensor electrodes to a prior configuration when no input is detected in the sensing region for at least a second threshold duration.

10. A method of operating an input device, comprising:
   detecting a first input in a sensing region of the input device;
   determining a force of the first input based on force information received via one or more force sensors; and
   dynamically increasing a sensitivity of a plurality of sensor electrodes in response to an amplitude of the force exceeds a force threshold for at least a first threshold duration, wherein the plurality of sensor electrodes is configured for capacitive sensing in the sensing region.

11. The method of claim 10, further comprising:
   detecting that a trigger condition is satisfied, at least in part, when the amplitude of the force exceeds the force threshold for at least the first threshold duration.

12. The method of claim 11, further comprising:
   acquiring capacitive sensing information about the first input via the plurality of sensor electrodes; and
   determining, based on the capacitive sensing information, that a capacitive property of the first input is below a capacitive threshold.

13. The method of claim 12, wherein the trigger condition is satisfied when the amplitude of the force exceeds the force threshold for at least the first threshold duration and the capacitive property of the first input is below the capacitive threshold.

14. The method of claim 12, further comprising:
   determining a capacitive sensing baseline for one or more of the sensor electrodes, when the trigger condition is satisfied, based at least in part on the capacitive sensing information about the first input.

15. The method of claim 11, further comprising:
   requesting a second input from a user of the input device when the trigger condition is satisfied; and
   adjusting the sensitivity of the plurality of sensor electrodes upon receiving the second input.

16. The method of claim 15, further comprising:
   acquiring capacitive sensing information about the second input via the plurality of sensor electrodes; and
   determining a capacitive sensing baseline for one or more of the sensor electrodes based at least in part on the capacitive sensing information about the second input.

17. The method of claim 10, further comprising:
   restoring the sensitivity of the plurality of sensor electrodes to a prior configuration when no input is detected in the sensing region for at least a second threshold duration.

18. A non-transitory computer-readable medium storing instructions that, when executed by processing circuitry of an input device, cause the input device to perform operations comprising:
   detecting a first input in a sensing region of the input device;
   determining a force of the first input based on force information received via one or more force sensors; and
   dynamically increasing a sensitivity of a plurality of sensor electrodes in response to an amplitude of the force exceeding a force threshold for at least a first threshold duration, wherein the plurality of sensor electrodes is configured for capacitive sensing in the sensing region.

* * * * *